United States Patent
Cho et al.

(10) Patent No.: US 11,431,006 B2
(45) Date of Patent: Aug. 30, 2022

(54) SYSTEM FOR SUPPLYING HYDROGEN USING WASTE HEAT OF FUEL CELL AND METHOD FOR CONTROLLING THE SAME

(71) Applicants: HYUNDAI MOTOR COMPANY, Seoul (KR); KIA CORPORATION, Seoul (KR)

(72) Inventors: Young Jin Cho, Gimhae-si (KR); Kyung Moon Lee, Uiwang-si (KR); Byeong Soo Shin, Uiwang-si (KR); Hoon Mo Park, Seongnam-si (KR); Dong Hoon Nam, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/307,786

(22) Filed: May 4, 2021

(65) Prior Publication Data

US 2022/0149398 A1    May 12, 2022

(30) Foreign Application Priority Data

Nov. 6, 2020   (KR) .................. 10-2020-0147729

(51) Int. Cl.
  *H01M 8/04089*   (2016.01)
  *H01M 8/04014*   (2016.01)
  *H01M 8/04746*   (2016.01)
  *H01M 8/04007*   (2016.01)

(52) U.S. Cl.
  CPC ... *H01M 8/04097* (2013.01); *H01M 8/04022* (2013.01); *H01M 8/04074* (2013.01); *H01M 8/04768* (2013.01)

(58) Field of Classification Search
  CPC ......... H01M 8/04097; H01M 8/04022; H01M 8/04074; H01M 8/04768
  See application file for complete search history.

(56) References Cited

U.S. PATENT DOCUMENTS

| | | | | |
|---|---|---|---|---|
| 2003/0175563 | A1* | 9/2003 | Bruck ................... | H01M 8/065 429/444 |
| 2004/0137285 | A1* | 7/2004 | Meltser ............. | H01M 8/04022 429/444 |
| 2008/0318093 | A1* | 12/2008 | Lee ................... | H01M 8/04141 429/435 |

FOREIGN PATENT DOCUMENTS

KR          10-1378983 B1     4/2014

* cited by examiner

*Primary Examiner* — Stewart A Fraser
(74) *Attorney, Agent, or Firm* — Lempia Summerfield Katz LLC

(57) ABSTRACT

A system for supplying hydrogen using waste heat of a fuel cell includes: a fuel cell to produce electric power using hydrogen; an internal cooling line in which a cooling medium flows and configured to pass through the fuel cell while cooling the fuel cell with the cooling medium; a solid hydrogen storage provided on a downstream side of the fuel cell on the internal cooling line and configured to discharge the hydrogen through absorption of waste heat of the heated cooling medium and to supply the discharged hydrogen to the fuel cell; and a hydrogen supply line to connect the solid hydrogen storage and the fuel cell and to supply the discharged hydrogen. In particular, the internal cooling line is reconnected to the fuel cell after passing through the solid hydrogen storage and provides the cooled cooling medium to the fuel cell.

12 Claims, 7 Drawing Sheets

SYSTEM FOR SUPPLYING HYDROGEN USING WASTE HEAT OF FUEL CELL AND METHOD FOR CONTROLLING THE SAME

CROSS REFERENCE TO RELATED APPLICATION

This application claims priority to and the benefit of Korean Patent Application No. 10-2020-0147729, filed on Nov. 6, 2020, the entire contents of which are incorporated herein by reference.

FIELD

The present disclosure relates to a system for supplying hydrogen to a fuel cell using waste heat being inevitably generated in a power generation process of the fuel cell and a method for controlling the same.

BACKGROUND

The statements in this section merely provide background information related to the present disclosure and may not constitute prior art.

Since the earth's average temperature has been increased through an excessive discharge of greenhouse gases caused by an excessive usage of fossil energy, abnormal climates have occurred all over the world. In order to prevent the earth's average temperature from being increased, many developed countries have joined Kyoto Protocol and Paris Agreement, and technology developments for replacing the fossil energy by new renewable energy, such as wind force, sunlight, wastes, or hydrogen, have continuously been made.

Among them, in contrast with the fossil energy, the hydrogen energy is attracting a lot of attention as new renewable energy since it generates less greenhouse gases such as $CO_2$ and pollutants such as $NO_x$ and $SO_x$, and has high energy efficiency.

A hydrogen fuel cell is a device which generates power through conversion of chemical energy being generated by an electrochemical reaction of oxygen ($O_2$) and hydrogen ($H_2$) into electric energy, and generates environment-friendly energy since it produces water ($H_2O$) and heat as by-products.

Schemes for reusing even the water and the heat being produced from the hydrogen fuel cell in addition to the generated energy have been in the limelight, and the present disclosure is to utilize the heat, inevitably generated in the power generation process of the fuel cell, in re-supplying the hydrogen to the fuel cell without directly discharging the generated heat.

The foregoing is intended merely to aid in the understanding of the background of the present disclosure, and is not intended to mean that the present disclosure falls within the purview of the related art that is already known to those of ordinary skill in the art.

SUMMARY

The present disclosure is proposed to utilize waste heat being generated during power generation of a fuel cell, and provides a system for supplying hydrogen using waste heat of a fuel cell and a method for controlling the same, which can advantageously apply a high weight density, which is the disadvantage of a solid hydrogen storage, to construction equipment requiring an environment-friendly power supply.

According to one form of the present disclosure, a system for supplying hydrogen using waste heat of a fuel cell includes: a fuel cell configured to be supplied with hydrogen and to produce power; an internal cooling line in which a cooling medium flows and configured to pass through the fuel cell while cooling the fuel cell with the cooling medium, the cooling medium configured to be heated by the fuel cell when the fuel cell generates the power; a solid hydrogen storage provided on a downstream side of the fuel cell on the internal cooling line and configured to discharge the hydrogen through absorption of waste heat from the heated cooling medium and to supply the discharged hydrogen to the fuel cell; and a hydrogen supply line configured to connect the solid hydrogen storage and the fuel cell and to supply the discharged hydrogen. In particular, the internal cooling line is reconnected to the fuel cell after passing through the solid hydrogen storage, and the cooling medium is cooled by transferring the waste heat to the hydrogen in the solid hydrogen storage and configured to flow into the fuel cell along the internal cooling line.

The internal cooling line may be provided with a bypass line configured to make the cooling medium after flowing through the fuel cell bypass the solid hydrogen storage, the bypass line may be provided with a multi-way valve configured to control a flow path of the cooling medium, and the cooling medium flowing through the fuel cell may circulate through the solid hydrogen storage or may flow into the fuel cell by bypassing the solid hydrogen storage, under the control of the multi-way valve for cooling.

The internal cooling line may further include a cooling water pump configured to circulate the cooling medium, and the cooling water pump may be provided between the fuel cell and the multi-way valve for cooling.

The solid hydrogen storage may be provided with an adsorbent configured to adsorb the hydrogen and a remaining buffer space except the adsorbent, the hydrogen in a gaseous state may be stored in the buffer space, and the solid hydrogen storage may supply the hydrogen in the buffer space to the fuel cell through the hydrogen supply line in case that the solid hydrogen storage is unable to receive the waste heat transferred through the cooling medium.

The internal cooling line may be provided with a bypass line configured to make the cooling medium flowing through the fuel cell bypass the solid hydrogen storage, the bypass line may be provided with a multi-way valve for cooling, the cooling medium flowing through the fuel cell may bypass the solid hydrogen storage at a cold startup of the fuel cell, and the solid hydrogen storage may supply the hydrogen in the buffer space to the fuel cell through the hydrogen supply line.

The solid hydrogen storage may be composed of a plurality of storage tanks, the plurality of storage tanks may be connected in series through a tank cooling line, and the tank cooling line may be connected to the internal cooling line.

The solid hydrogen storage may be composed of a plurality of storage tanks, the plurality of storage tanks may be connected in parallel through a tank cooling line, and the tank cooling line may be connected to the internal cooling line.

The hydrogen supply line may be provided with a multi-way valve for charging, and the solid hydrogen storage may be supplied with the hydrogen from an outside through the multi-way valve for charging.

An external cooling line may be connected to the solid hydrogen storage, and may cool the solid hydrogen storage in case that the solid hydrogen storage is supplied with the hydrogen from an outside and is heated.

In case that the solid hydrogen storage is supplied with the hydrogen from an outside and is heated, the fuel cell may stop its operation, and the solid hydrogen storage may be cooled through the internal cooling line.

According to another form of the present disclosure, a method for controlling the above-proposed system for supplying hydrogen using waste heat of a fuel cell includes: performing power generation by a fuel cell; cooling the fuel cell by making an internal cooling line circulate; providing waste heat of the fuel cell to a solid hydrogen storage by making the internal cooling line circulate; and discharging hydrogen by the solid hydrogen storage through absorption of the waste heat of the fuel cell, and supplying the discharged hydrogen to the fuel cell through a hydrogen supply line.

According to the present disclosure, it is possible to supply the hydrogen to the fuel cell using the waste heat generated from the fuel cell, and to increase the cooling efficiency through addition of the cooling means of the heated cooling medium. Further, the present disclosure can be applied to equipment or machinery which is unable to enter a road and thus is unable to use a hydrogen charging station. Further, since such equipment or machinery requires its high body weight density in order to increase stability, it is unsuitable to apply a high-pressure gas type hydrogen supply device to the equipment or machinery, but it is more suitable to apply a solid hydrogen storage thereto.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
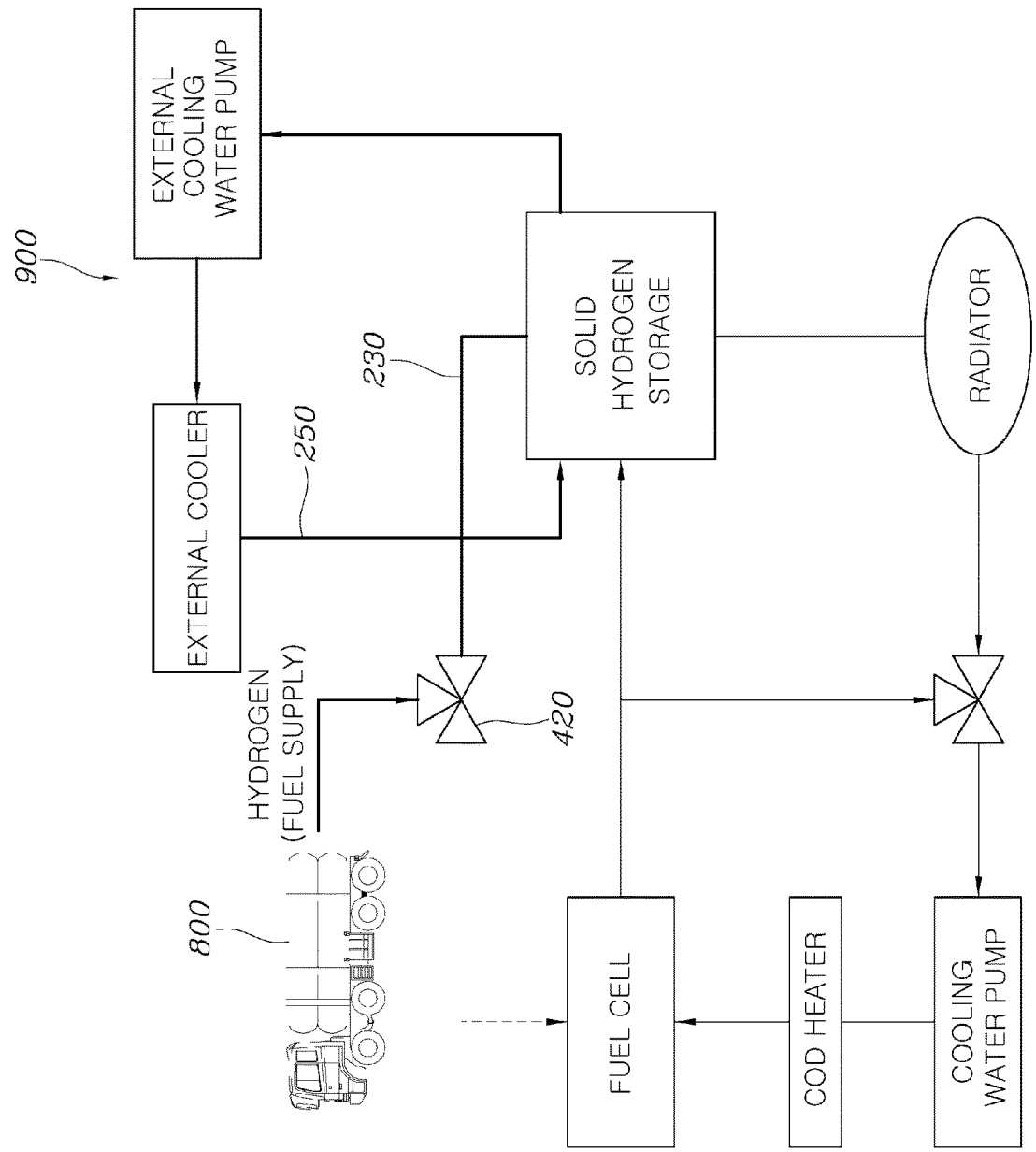
Figure 6:
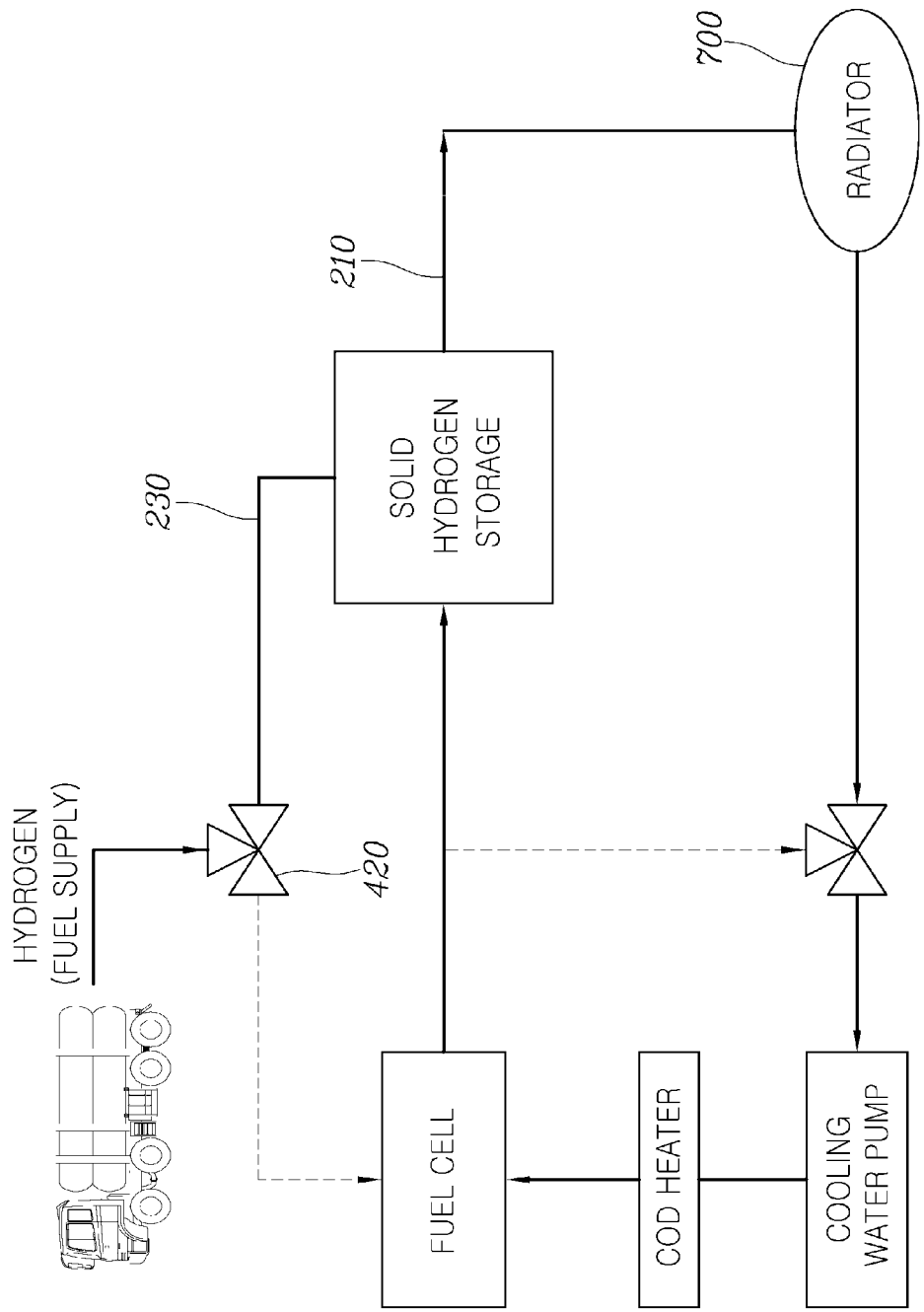
Figure 7:
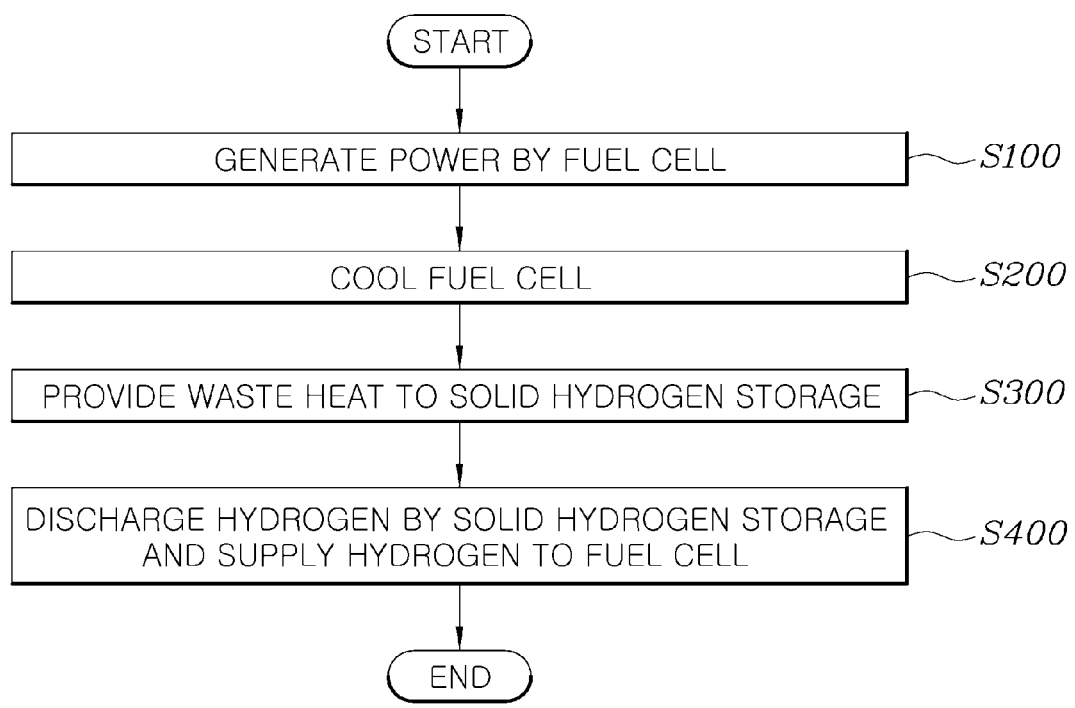

FIGS. 5 and 6 are circuit diagrams of a system for supplying hydrogen using waste heat of a fuel cell according to some forms of the present disclosure, which cools a solid hydrogen storage in case that the hydrogen is supplied from an outside to the solid hydrogen storage; and FIG. 7 is a flowchart illustrating a method for controlling a system for supplying hydrogen using waste heat of a fuel cell according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and/or functional explanations on forms of the present disclosure disclosed in the present specification or application are merely exemplified for the purpose of explaining the forms of the present disclosure, and the forms according to the present disclosure may be carried out in various forms, and should not be interpreted to be limited to the forms described in the present specification or application.

Since forms according to the present disclosure may be variously modified and may have various forms, specific forms will be exemplified in the drawings and will be described in detail in the present specification or application. However, it should be understood that the forms according to the concept of the present disclosure are not limited to the specific disclosed forms, but include all modifications, equivalents, and/or alternatives that are included in the idea and technical scope of the present disclosure.

The terms, such as "first and/or second", may be used to describe diverse constituent elements, but the constituent elements should not be limited by the terms. The terms are only for the purpose of discriminating one constituent element from another constituent element, and for example, without departing from the scope according to the concept of the present disclosure, a first constituent element may be called a second constituent element, and the second constituent element may be called the first constituent element in a similar manner.

It should be understood that if a certain constituent element is mentioned to be "connected" or "coupled" to another constituent element, it includes both a case that the certain constituent element is directly connected or coupled to the another constituent element and a case that the certain constituent element is connected or coupled to the another constituent element via still another constituent element. In contrast, if a certain constituent element is mentioned to be "directly connected or coupled" to another constituent element, it should be understood that the certain constituent element is connected or coupled to another constituent element without intervention of any other constituent element. Other expressions for explaining the relationship between the constituent elements, that is, "between" and "just between" or "neighboring" and "directly neighboring" should be interpreted in the same manner.

The terms used in the present specification are used to describe exemplary forms only, but are not intended to limit the present disclosure. A singular expression includes a plural expression unless clearly defined. In the present specification, it should be understood that the term "include" or "have" specifies the presence of stated features, numerals, steps, operations, constituent elements, parts, or a combination thereof, but do not preclude the presence or addition of one or more other features, numerals, steps, operations, constituent elements, parts, or a combination thereof.

Unless otherwise defined, all terms (including technical and scientific terms) used herein have the same meanings as those commonly understood by those ordinary skilled in the art to which the present disclosure belongs. The terms that are used in the present specification and are defined in a generally used dictionary should be interpreted as meanings that match with the meanings of the terms from the context of the related technology, and they are not interpreted as an ideally or excessively formal meaning unless clearly defined.

Hereinafter, the present disclosure will be described in detail through description of exemplary forms of the present disclosure with reference to the accompanying drawings. The same reference numerals proposed in the respective drawings denote the same members.

Figure 1:
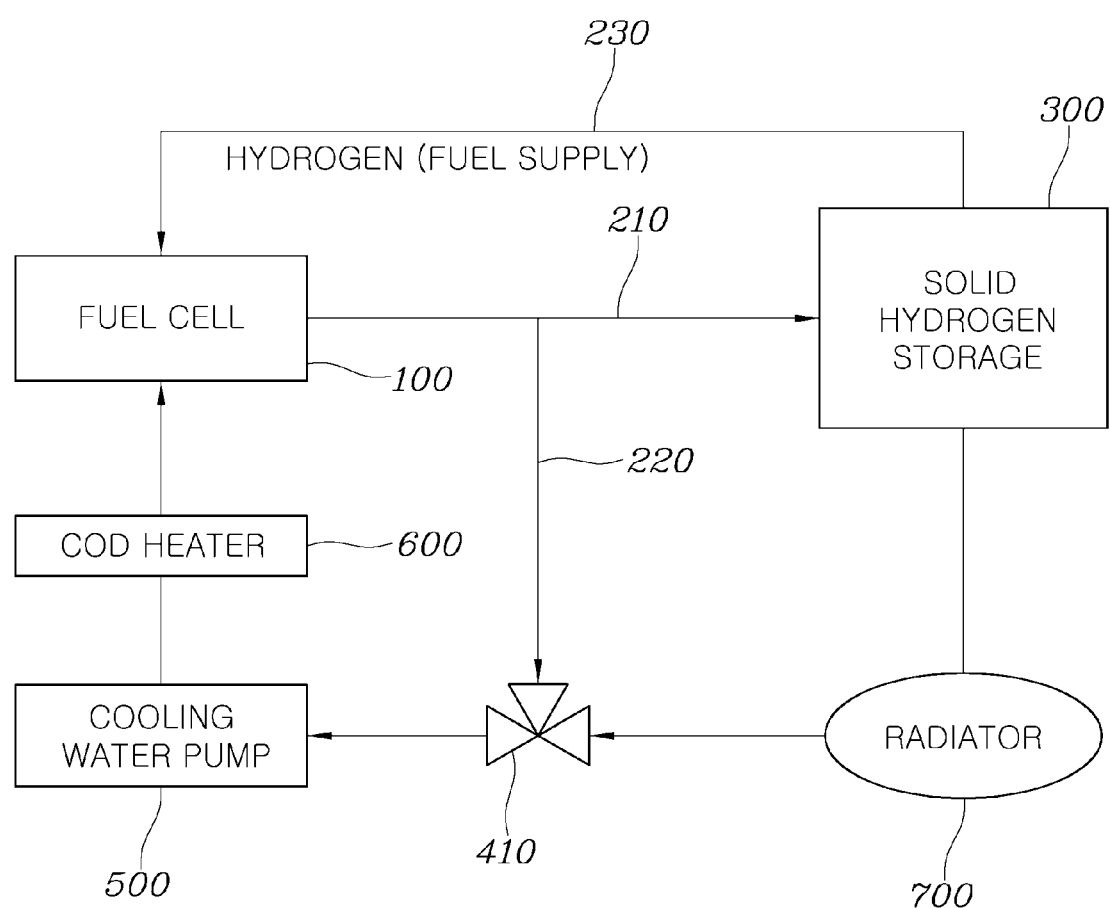
FIG. 1 is a circuit diagram of a system for supplying hydrogen using waste heat of a fuel cell according to one form of the present disclosure.
Figure 2:
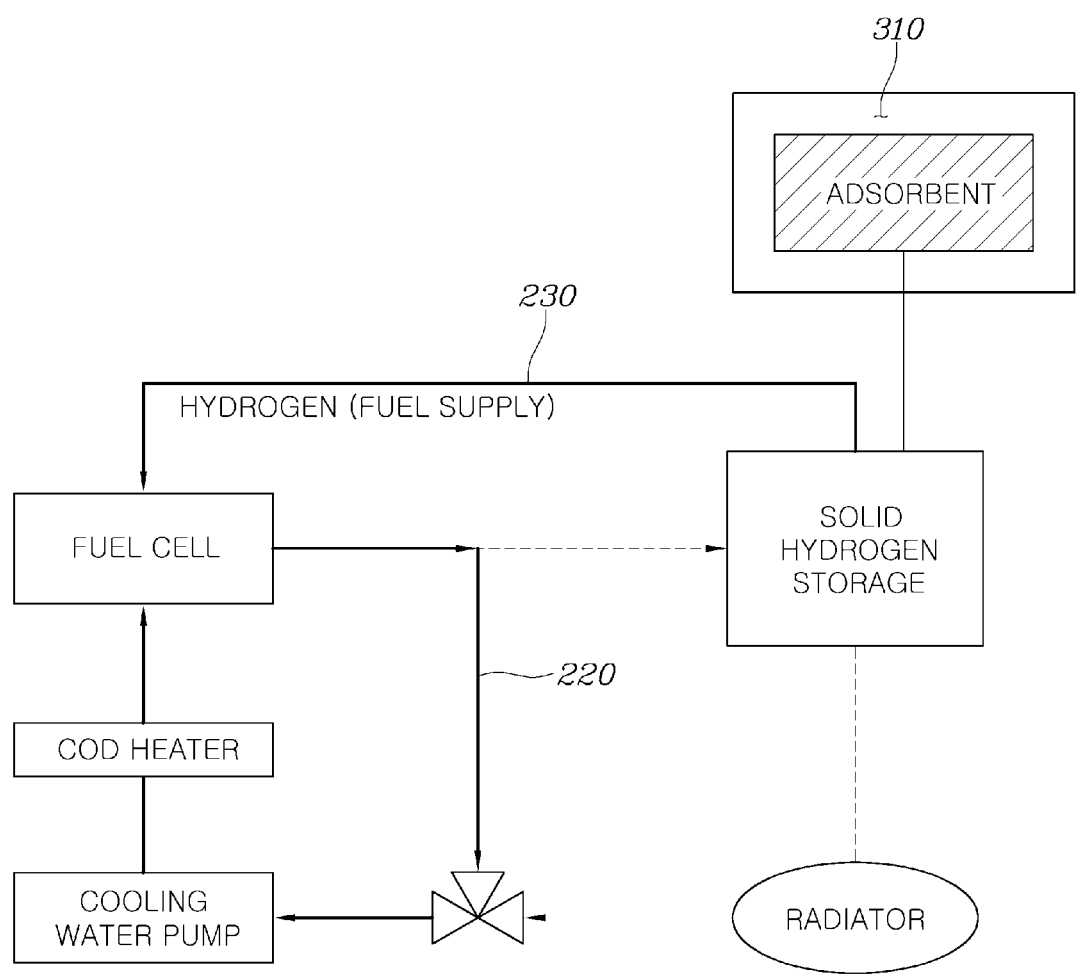
FIG. 2 is a circuit diagram of a system for supplying hydrogen using waste heat of a fuel cell at a cold startup according to another form of the present disclosure.
Figure 3:
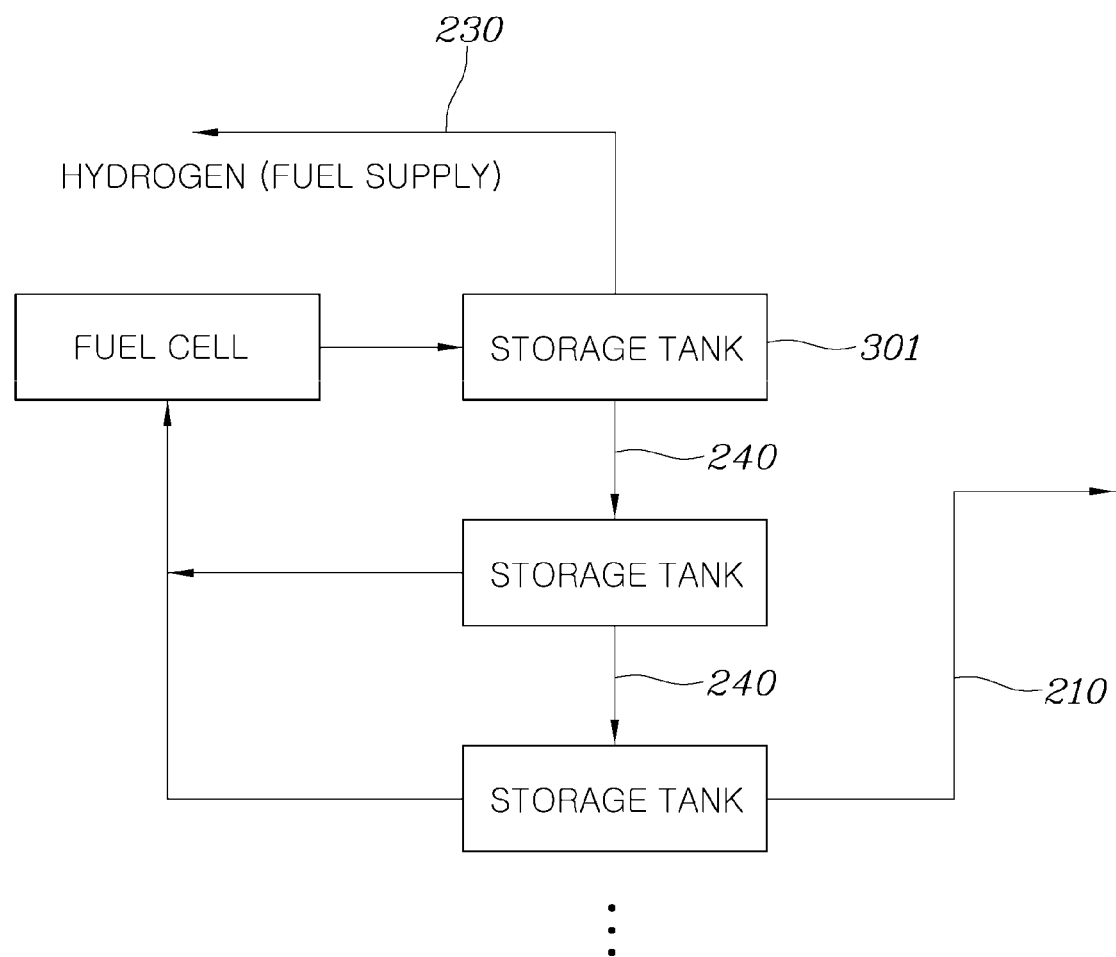
FIG. 3 is a diagram illustrating a part of a system for supplying hydrogen using waste heat of a fuel cell according to one form of the present disclosure, to which a solid hydrogen storage is connected in series.
Figure 4:
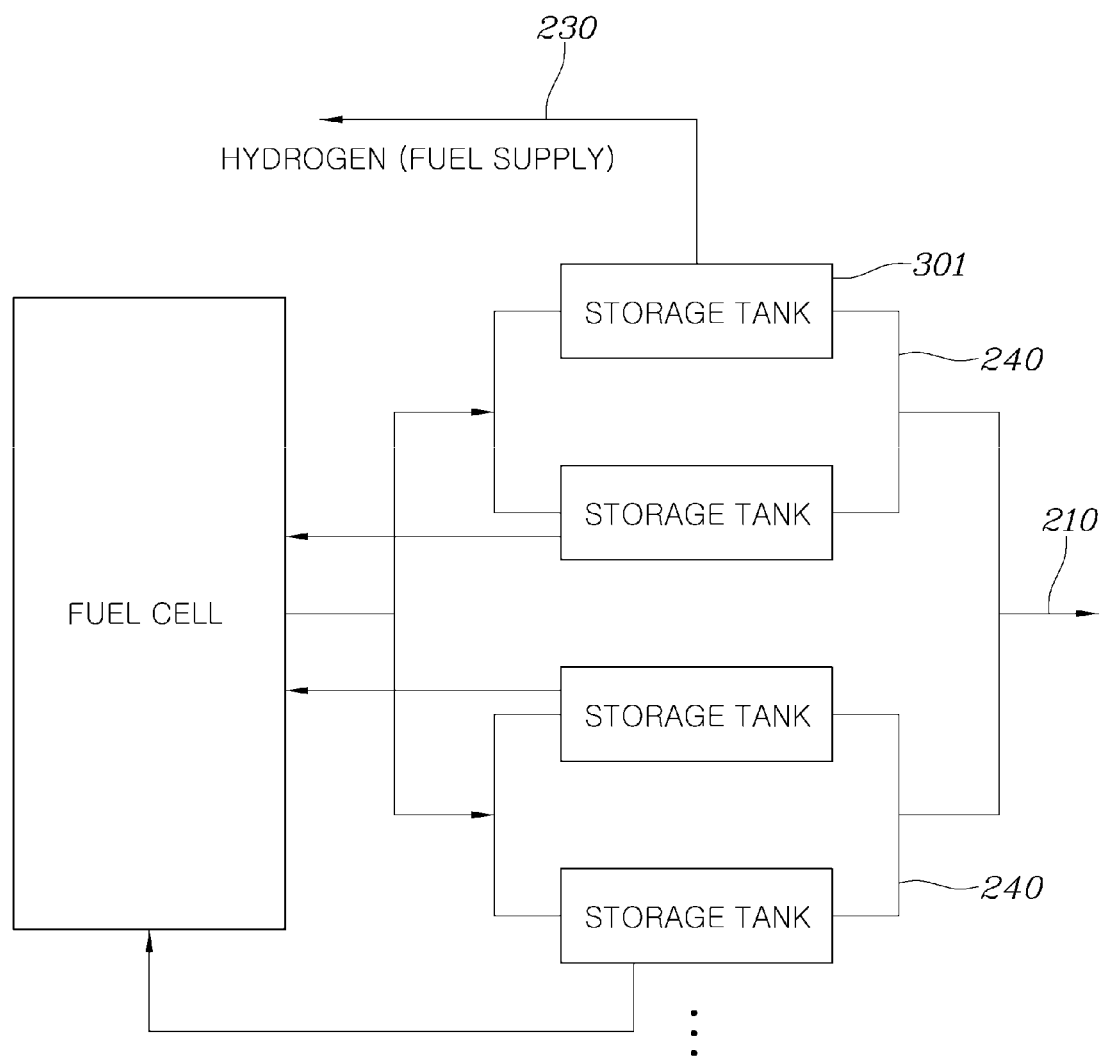
FIG. 4 is a diagram illustrating a part of a system for supplying hydrogen using waste heat of a fuel cell according to one form of the present disclosure, to which a solid hydrogen storage is connected in parallel.

FIG. 1 is a circuit diagram of a system for supplying hydrogen using waste heat of a fuel cell according to one form of the present disclosure, FIG. 2 is a circuit diagram of a system for supplying hydrogen using waste heat of a fuel cell at a cold startup according to another form of the present disclosure, FIG. 3 is a diagram illustrating a part of a system for supplying hydrogen using waste heat of a fuel cell according to one form of the present disclosure, to which a solid hydrogen storage is connected in series, FIG. 4 is a diagram illustrating a part of a system for supplying hydrogen using waste heat of a fuel cell according to one form of the present disclosure, to which a solid hydrogen storage is connected in parallel, FIGS. 5 and 6 are circuit diagrams of a system for supplying hydrogen using waste heat of a fuel cell according to one form of the present disclosure, which cools a solid hydrogen storage in case that the hydrogen is supplied from an outside to the solid hydrogen storage, and FIG. 7 is a flowchart illustrating a method for controlling a system for supplying hydrogen using waste heat of a fuel cell according to one form of the present disclosure.

A hydrogen fuel cell is a device that generates power using hydrogen and oxygen. During the power generation of the hydrogen fuel cell, water and heat are inevitably generated, and since the heat generated from the hydrogen fuel cell decreases the efficiency of the fuel cell and imposes a burden on the durability of the cell, the generated heat is generally discharged as the waste heat through heat exchange with an outside by means of a cooling medium.

According to the system for supplying the hydrogen using the waste heat of the fuel cell according to the present disclosure, the waste heat being generated from the fuel cell and not having been utilized in the past can be reused to supply the hydrogen to the hydrogen fuel cell to increase the thermal efficiency, and can be applied to the machinery or equipment, which may have a stability problem in case that the existing high-pressure hydrogen storage system is applied thereto, to improve the stability.

FIG. 1 is a circuit diagram of a system for supplying hydrogen using waste heat of a fuel cell according to one form of the present disclosure. Hereinafter, the system for supplying hydrogen using waste heat of a fuel cell in one form of the present disclosure to achieve the above object will be described with reference to FIG. 1. The system for supplying hydrogen using waste heat of a fuel cell includes: a fuel cell 100 configured to be supplied with hydrogen and to produce power; an internal cooling line 210 configured to circulate through the fuel cell for cooling when the fuel cell generates the power; a solid hydrogen storage 300 provided on a downstream side of the fuel cell on the internal cooling line and configured to discharge the hydrogen through absorption of waste heat of a heated cooling medium and to supply the discharged hydrogen to the fuel cell; and a hydrogen supply line 230 configured to connect the solid hydrogen storage and the fuel cell and to supply the discharged hydrogen, wherein the internal cooling line is reconnected to the fuel cell after flowing through the solid hydrogen storage and provides the cooled cooling medium to the fuel cell.

Specifically, the waste heat generated from the hydrogen fuel cell is transferred to the cooling medium and the cooling medium cools the fuel cell, and the cooling medium having received the transferred waste heat transfers the waste heat to the solid hydrogen storage provided on the downstream side of the internal cooling line. The solid hydrogen storage may be provided with an adsorbent, which adsorbs the hydrogen. Since a reaction for desorbing the hydrogen from the adsorbent is an endothermic reaction, the waste heat generated from the fuel cell may be transferred to the solid hydrogen storage through the internal cooling line, and the hydrogen may be desorbed from the adsorbent and may be supplied to the fuel cell through the hydrogen supply line. The circuit may further include a radiator 700 for secondarily cooling the cooling medium and a COD heater 600 for heating the cooling medium flowing into the fuel cell or exhausting the residual hydrogen when a machine using the fuel cell starts off.

If the heat generated from the fuel cell is accumulated in the fuel cell, it exerts an adverse effect on the performance and the durability of the fuel cell. Thus, in the related art, the heat is absorbed by the cooling medium such as cooling water and is discharged through heat exchange with an outside. However, if the solid hydrogen storage for storing the hydrogen is disposed on the downstream side of the fuel cell, the waste heat can be primarily transferred to the solid hydrogen storage, and thus the waste heat can be utilized through supply of the hydrogen to the fuel cell. That is, the hydrogen having consumed in the power generation process of the fuel cell is re-supplied to the fuel cell simultaneously with the cooling of the cooling medium, and thus the thermal efficiency can be increased.

More specifically, since the heat is generated from the fuel cell in proportion to the degree of hydrogen consumption, and is supplied to the solid hydrogen storage, the hydrogen is desorbed in proportion to the consumed hydrogen, and thus it is possible to block the fuel cell load caused by an excessive injection of the hydrogen fuel.

Further, the present disclosure can be applied to construction equipment, machinery, or power plant, which is unable to enter a road and thus is unable to use a hydrogen charging station due to distinctiveness of the size or the body thereof, and the hydrogen necessary for the power generation of the fuel cell can be supplied from the solid hydrogen storage to the above equipment or the like. Accordingly, by applying the system according to the present disclosure to the above equipment or the like, it is possible to utilize the hydrogen fuel cell even in the above equipment or the like.

Further, the fixed type construction machinery or power plant requires a low-pressure hydrogen operation for stability. In case of using the solid hydrogen storage system, hydrogen storage and discharge within 8 to 50 bar is possible, and it is possible to secure stability through the use of the low-pressure hydrogen. In case of storing the hydrogen in the solid hydrogen storage, charging at 8 to 50 bar is possible without the necessity of secondary compression, and cooling supply is also unnecessary. Since additional equipment being essential to use the high-pressure hydrogen gas is not necessary, the system can be constructed at low costs.

Further, when the construction equipment or machinery lifts up a heavy construction material, the moment of the equipment body (construction equipment) is required to be larger than the moment of the material in order to secure the stability of the equipment or machinery. If a high-pressure gas type is applied to the fuel cell hydrogen supply device, the weight density of the body of the equipment or machinery is smaller than the density of the existing battery, diesel engine, or fuel, which makes it impossible to secure the stability. However, in case of using a metal having a high weight density as the adsorbent, the moment of the equipment body may be designed to be larger than the moment of the material, and thus the metal adsorbent is especially suitable for the construction equipment or machinery.

More specifically, as the adsorbent, an $AB_2$ or $AB_5$ series alloy may be generally used. The $AB_2$ or $AB_5$ series alloy can desorb the hydrogen adsorbed at a temperature in the range of a room temperature to 60 degrees. Further, in order to design the body of the equipment or machinery to be heavy or light, a material having a low storage density may be applied to make the body heavy, or a material having a high weight density may be applied to lighten the weight of the body.

Next, a cold startup mode of the system will be described. FIG. 2 is a circuit diagram of a system for supplying hydrogen using waste heat of a fuel cell at a cold startup according to one form of the present disclosure. Referring to FIG. 2, the internal cooling line 210 may be provided with a bypass line 220 configured to make the cooling medium flowing through the fuel cell bypass the solid hydrogen storage 300, the bypass line may be provided with a multi-way valve 410 for cooling, and the cooling medium flowing through the fuel cell 100 may circulate through the solid hydrogen storage or may flow into the fuel cell by bypassing the solid hydrogen storage, under the control of the multi-way valve for cooling.

In one form, the internal cooling line may be provided with the bypass line that does not pass through the solid hydrogen storage, and the bypass line may be further provided with the multi-way valve for cooling, through which the cooling medium flowing on the bypass line may flow into the fuel cell. Meanwhile, under the control of the multi-way valve, the cooling medium may not flow onto the bypass line, or may flow only onto the bypass line without passing through the solid hydrogen storage.

In general, in case that the operation of the machinery is maintained, the cooling medium does not flow onto the bypass line, but flows into the solid hydrogen storage through the internal cooling line to transfer the waste heat and to generate the hydrogen, and then is secondarily cooled by the radiator. However, an initial operation of the machinery, a cold winter, or an initial startup of the machinery may be low temperature conditions in order for the fuel cell to be driven. In these cases, the waste heat of the fuel cell may be used to heat the fuel cell by controlling the cooling medium not to flow into the solid hydrogen storage through the control of the bypass line and the multi-way valve. That is, if it is difficult for the cold startup or the cooling water temperature to sufficiently heat the fuel cell, the multi-way valve for cooling may be controlled in the above-described manner to adjust the flow of the cooling medium so that the cooling medium does not flow into the solid hydrogen storage.

Meanwhile, the internal cooling line may further include a cooling water pump 500 configured to circulate the cooling medium, and the cooling water pump may be provided between the fuel cell 100 and the multi-way valve 410 for cooling.

Referring to FIG. 2, the solid hydrogen storage 300 may be provided with an adsorbent configured to adsorb the hydrogen and a remaining buffer space 310 except the adsorbent, the hydrogen in a gaseous state may be stored in the buffer space, and the solid hydrogen storage may supply the hydrogen in the buffer space to the fuel cell through the hydrogen supply line 230 in case that the solid hydrogen storage is unable to receive the waste heat transferred through the cooling medium.

Specifically, in order for the fuel cell to be driven with good efficiency and to minimize the influence on the fuel cell durability, such as inner membrane damage of the fuel cell, it is required that the fuel cell is driven at a proper temperature. Accordingly, if the temperature of the fuel cell is too low for the fuel cell to be driven, the cooling medium may receive and supply the waste heat of the fuel cell again to the fuel cell, and the cooling medium may be heated by a COD heater 600 to heat the fuel cell. In this case, it is difficult for the waste heat to be sufficiently transferred to the sold hydrogen storage to cause the hydrogen to be unable to be desorbed, and the solid hydrogen storage is provided with the buffer space, which is an empty space except the adsorbent, and the hydrogen gas having not been adsorbed is stored in the buffer space. That is, the buffer space 310 except the adsorbent is provided in the solid hydrogen storage, and the hydrogen in a non-adsorbed state is stored in the solid hydrogen storage to be able to be supplied to the fuel cell.

The internal cooling line may be provided with the bypass line 220 configured to make the cooling medium flowing through the fuel cell 100 bypass the solid hydrogen storage 300, and the bypass line may be provided with the multi-way valve 410 for cooling. Accordingly, the cooling medium flowing through the fuel cell may bypass the solid hydrogen storage at a cold startup of the fuel cell, and the solid hydrogen storage may supply the hydrogen in the buffer space 310 to the fuel cell through the hydrogen supply line 230.

In one form, in the cold startup mode, the solid hydrogen storage is bypassed through the multi-way valve for cooling, and thus it is difficult for the waste heat for desorbing the hydrogen to sufficiently arrive at the solid hydrogen storage. Accordingly, a system is desired in which the solid hydrogen storage can supply the hydrogen to the fuel cell even without receiving the waste heat in the cold startup mode, and thus the buffer space, which is the space except the adsorbent, is provided in the solid hydrogen storage, and the gaseous hydrogen exists in a non-adsorbed state in the buffer space. Accordingly, the hydrogen can be transferred to the fuel cell even if the cooling medium bypasses the sold hydrogen storage. Since the time required for the cold startup is generally less than one minute, the buffer space may be provided with a volume enough to supply the hydrogen for less than one minute.

Accordingly, in the cold startup mode or when the cooling medium is in the state insufficient to heat the fuel cell, the fuel cell can generate the power using the hydrogen gas stored in the buffer space by supplying the hydrogen gas exceeding the adsorption capacity of the adsorbent to the solid hydrogen storage, and storing some hydrogen in a non-adsorbed gaseous state. In this case, under the control of the multi-way valve for cooling, the cooling medium may not pass through the solid hydrogen storage, and may be heated by the COD heater to heat the fuel cell.

Next, FIG. 3 is a diagram illustrating a part of a system for supplying hydrogen using waste heat of a fuel cell according to another form of the present disclosure, to which a solid hydrogen storage is connected in series. Referring to FIG. 3, the solid hydrogen storage may be composed of a plurality of storage tanks 301, the plurality of storage tanks may be connected in series through a tank cooling line 240, and the tank cooling line may be connected to the internal cooling line.

Specifically, in case that the plurality of storage tanks 301 are connected in series through the tank cooling line 240, the primary cooling area of the solid hydrogen storage is increased more than twice, the cooling amount is increased, and the hydrogen generation amount is increased. Accordingly, the cooling efficiency may be additionally increased. This structure is suitable for a low-output high-cooling system.

FIG. 4 is a diagram illustrating a part of a system for supplying hydrogen using waste heat of a fuel cell according to one form of the present disclosure, to which a solid hydrogen storage is connected in parallel. Referring to FIG. 4, the solid hydrogen storage may be composed of a plurality of storage tanks 301, the plurality of storage tanks may be connected in parallel through a tank cooling line 240, and the tank cooling line may be connected to the internal cooling line 210.

In one form, in case that the plurality of storage tanks 301 are connected in parallel through the tank cooling line 240, the cooling medium having the same temperature transfers the waste heat by passing through the solid hydrogen storage, and thus the hydrogen generation amount may be instantaneously increased. This structure is suitable for a high-load high-output system having a large instantaneous hydrogen generation amount. By adopting the parallel structure, a process of supplying the hydrogen to the storage tank and a process of supplying the hydrogen from the storage tank to the fuel cell can be simultaneously performed through installation of additional lines or valves, and it is possible to store the hydrogen in the storage tank even outside of the break time and thus the efficient system can be constructed.

FIGS. 5 and 6 are circuit diagrams of a system for supplying hydrogen using waste heat of a fuel cell, which cools a solid hydrogen storage in case that the hydrogen is supplied from an outside to the solid hydrogen storage in the system for supplying the hydrogen using the waste heat of the fuel cell according to another form of the present disclosure. Referring to FIG. 5, the hydrogen supply line may be provided with a multi-way valve 420 for charging, and the solid hydrogen storage may be supplied with the hydrogen from an external system, such as a tube trailer 800, through the multi-way valve for charging.

Specifically, the system for supplying hydrogen using waste heat of a fuel cell according to the present disclosure is suitably applicable to the construction equipment, machinery, or power plant, which has a difficulty in entering a road and thus is unable to use a hydrogen charging station due to distinctiveness of the size or the body thereof, and if the hydrogen in the solid hydrogen storage is all exhausted, the solid hydrogen storage needs to be supplied with the hydrogen from the outside. Accordingly, the solid hydrogen storage may be connected to an external hydrogen source through the multi-way valve for charging provided on the hydrogen supply line and be supplied with the hydrogen. The hydrogen can be stored at a pressure within 8 to 50 bar, and it is possible to secure the stability through the use of the low-pressure hydrogen. In this case, since the secondary compression and the cooling supply are unnecessary, equipment required to use the high-pressure hydrogen gas is not necessary, and thus the system can be constructed at low costs.

Meanwhile, an external cooling line 250 is connected to the solid hydrogen storage, and in case that the solid hydrogen storage is supplied with the hydrogen from the outside and is heated, the solid hydrogen storage can be cooled through the external cooling line.

Specifically, the reaction for adsorbing the hydrogen to the adsorbent is an exothermic reaction for discharging the heat to the outside. Accordingly, as the reaction proceeds, the temperature of the solid hydrogen storage is increased, and as the temperature is increased, the bond reaction speed between the hydrogen and the adsorbent is lowered. Accordingly, in case of supplying the hydrogen to the sold hydrogen storage, the cooling of the solid hydrogen storage is desired.

In this case, the solid hydrogen storage may be provided with the external cooling line 250 to which an external cooling unit 900 can be connected. In one form, the external cooling unit 900 includes an external cooling water pump and an external cooler for cooling the solid hydrogen storage. It is general that 6 to 8 hours are required to cool the solid hydrogen storage through natural cooling while the hydrogen is slowly supplied to the solid hydrogen storage. Thus, in case that the work should continue or the hydrogen should be urgently supplied to the solid hydrogen storage, the hydrogen may be supplied while the solid hydrogen storage is quickly cooled through external cooling. In case of utilizing the parallel connection of the external cooling and the solid hydrogen storage, a process of supplying the hydrogen to the storage tank and a process of supplying the hydrogen to the fuel cell can be independently performed, and thus the efficient system can be constructed.

Referring to FIG. 6, in case that the solid hydrogen storage is supplied with the hydrogen from the outside and is heated, the fuel cell may stop its operation, and the solid hydrogen storage 300 may be cooled through the internal cooling line 210.

Specifically, if there is not the constraint condition that the time to supply the hydrogen to the solid hydrogen storage is short, it is possible to perform the cooling using the radiator 700 built in the equipment and the like. The cooling using the radiator may be operated at the break time after work in the same manner as the natural cooling.

FIG. 7 is a flowchart illustrating a method for controlling a system for supplying hydrogen using waste heat of a fuel cell according to one form of the present disclosure. Referring to FIG. 7, the method for controlling a system for supplying hydrogen using waste heat of a fuel cell according to the present disclosure to achieve the above object is a method for controlling the above-proposed hydrogen supply system. The method includes: performing power generation by a fuel cell (step S100); cooling the fuel cell by making an internal cooling line circulate (step S200); providing waste heat of the fuel cell to a solid hydrogen storage by making the internal cooling line circulate (step S300); and discharging hydrogen by the solid hydrogen storage through absorption of the waste heat of the fuel cell, and supplying the discharged hydrogen to the fuel cell through a hydrogen supply line (step S400).

Specifically, by performing the above steps, it is possible to reuse the waste heat, generated from the fuel cell, in re-supplying the hydrogen to the fuel cell, and thus to increase the thermal efficiency. Since the system using the low-pressure hydrogen does not require the secondary compression and the low-temperature charging with the hydrogen as compared with the case of using the high-pressure gas supply system, the thermal efficiency is also increased, and the system becomes compact, which makes it possible to construct the system at low costs. Further, by adopting the adsorbent having low storage capacity and high density, it is possible to design the system in a direction in which the weight density of the equipment body is increased, and thus it is possible to design the system so that the center of gravity becomes close to the center of the body, thereby improving the stability of the equipment.

Although the exemplary forms of the present disclosure have been illustrated and described for illustrative purposes, those of ordinary skill in the art will appreciate that various modifications, additions and substitutions are possible, without departing from the technical idea of the present disclosure.

What is claimed is:

1. A system for supplying hydrogen using waste heat of a fuel cell, the system comprising:
   a fuel cell configured to be supplied with hydrogen and produce power;
   an internal cooling line in which a cooling medium flows and configured to pass through the fuel cell while cooling the fuel cell with the cooling medium, the cooling medium configured to be heated by the fuel cell when the fuel cell generates the power;
   a solid hydrogen storage provided on a downstream side of the fuel cell on the internal cooling line and configured to: discharge the hydrogen through absorption of waste heat from the heated cooling medium, and supply the discharged hydrogen to the fuel cell; and
   a hydrogen supply line configured to connect the solid hydrogen storage and the fuel cell and supply the discharged hydrogen,
   wherein the internal cooling line is reconnected to the fuel cell after passing through the solid hydrogen storage, and the cooling medium is cooled by transferring the waste heat to the hydrogen in the solid hydrogen storage and configured to flow into the fuel cell along the internal cooling line.

2. The system according to claim 1, wherein:
   the internal cooling line is provided with a bypass line configured to make the cooling medium after flowing through the fuel cell to bypass the solid hydrogen storage,
   the bypass line is provided with a multi-way valve configured to control a flow path of the cooling medium.

3. The system according to claim 2, wherein the multi-way valve is configured to control the cooling medium flowing through the fuel cell to circulate through the solid hydrogen storage or flow into the fuel cell by bypassing the solid hydrogen storage along the bypass line.

4. The system according to claim 2, wherein:
   the internal cooling line further comprises a cooling water pump configured to circulate the cooling medium, and
   the cooling water pump is provided between the fuel cell and the multi-way valve.

5. The system according to claim 1, wherein:
   the solid hydrogen storage is provided with an adsorbent configured to adsorb the hydrogen and a remaining buffer space except the adsorbent,
   the hydrogen in a gaseous state is stored in the buffer space, and
   the solid hydrogen storage supplies the hydrogen in the buffer space to the fuel cell through the hydrogen supply line in case that the solid hydrogen storage is unable to receive the waste heat transferred through the cooling medium.

6. The system according to claim 5, wherein:
   the internal cooling line includes a bypass line provided with a multi-way valve configured to control the cooling medium after flowing through the fuel cell to bypass the solid hydrogen storage,
   the cooling medium after flowing through the fuel cell bypasses the solid hydrogen storage at a cold startup of the fuel cell, and
   the solid hydrogen storage is configured to supply the hydrogen in the buffer space to the fuel cell through the hydrogen supply line.

7. The system according to claim 1, wherein the solid hydrogen storage includes a plurality of storage tanks, the plurality of storage tanks are connected in series through a tank cooling line, and the tank cooling line is connected to the internal cooling line.

8. The system according to claim 1, wherein the solid hydrogen storage includes a plurality of storage tanks, the plurality of storage tanks are connected in parallel through a tank cooling line, and the tank cooling line is connected to the internal cooling line.

9. The system according to claim 1, wherein the hydrogen supply line is provided with a multi-way valve, and the solid hydrogen storage is supplied with the hydrogen from an outside through the multi-way valve for charging.

10. The system according to claim 1, wherein an external cooling line is connected to the solid hydrogen storage, and configured to cool the solid hydrogen storage in case that the solid hydrogen storage is supplied with the hydrogen from an outside and is heated.

11. The system according to claim 3, wherein when the solid hydrogen storage is supplied with the hydrogen from an outside and is heated, the fuel cell is configured to stop its operation, and the solid hydrogen storage is cooled through the internal cooling line.

12. A method for controlling a system for supplying hydrogen using waste heat of a fuel cell, where the system comprises: the fuel cell, an internal cooling line connecting the fuel cell and a solid hydrogen storage provided on a downstream side of the fuel cell, a hydrogen supply line connecting the solid hydrogen storage and the fuel cell, the method comprising:
   performing power generation by the fuel cell;
   cooling the fuel cell with a cooling medium circulating along the internal cooling line;
   providing waste heat generated from the fuel cell to the solid hydrogen storage utilizing the cooling medium while flowing along the internal cooling line; and
   discharging hydrogen from the solid hydrogen storage through absorption of the waste heat from the cooling medium, and
   supplying the discharged hydrogen to the fuel cell through the hydrogen supply line.

* * * * *